US009685100B2

(12) United States Patent
Choi et al.

(10) Patent No.: US 9,685,100 B2
(45) Date of Patent: Jun. 20, 2017

(54) ROLLABLE DISPLAY

(71) Applicant: Samsung Display Co., Ltd., Yongin, Gyeonggi-do (KR)

(72) Inventors: Kyungmin Choi, Seoul (KR); Youn Joon Kim, Seoul (KR); Sangjo Lee, Hwaseong-si (KR); Junghun Lee, Hwaseong-si (KR); Jusuck Lee, Seoul (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 37 days.

(21) Appl. No.: 14/709,078

(22) Filed: May 11, 2015

(65) Prior Publication Data

US 2016/0135284 A1    May 12, 2016

(30) Foreign Application Priority Data

Nov. 12, 2014  (KR) .......................... 10-2014-0157422

(51) Int. Cl.
  *H05K 1/00*   (2006.01)
  *G09F 9/30*   (2006.01)
  *G06F 1/16*   (2006.01)

(52) U.S. Cl.
  CPC ............ *G09F 9/301* (2013.01); *G06F 1/1652* (2013.01)

(58) Field of Classification Search
  USPC .... 361/728, 749, 752, 753; 345/1.1, 85, 107
  See application file for complete search history.

(56) References Cited

U.S. PATENT DOCUMENTS

| | | | |
|---|---|---|---|
| 6,498,597 B1 * | 12/2002 | Sawano | G09F 11/29 345/107 |
| 8,953,327 B1 * | 2/2015 | Salmon | G06F 1/1652 160/242 |
| 9,098,241 B1 * | 8/2015 | Cho | G06F 1/1652 |
| 2002/0070910 A1 * | 6/2002 | Fujieda | G06F 1/1615 345/85 |
| 2006/0192726 A1 * | 8/2006 | Huitema | G06F 1/1601 345/1.1 |
| 2007/0216639 A1 * | 9/2007 | LaFarre | G02F 1/167 345/107 |
| 2009/0233265 A1 * | 9/2009 | Budryk | B43L 1/00 434/412 |

FOREIGN PATENT DOCUMENTS

| | | |
|---|---|---|
| JP | 2000-132122 A | 5/2000 |
| JP | 2003-295291 A | 10/2003 |
| JP | 5090160 B2 | 9/2012 |
| JP | 3185933 U | 8/2013 |
| KR | 10-0818170 B1 | 3/2008 |
| KR | 10-2009-0006606 A | 1/2009 |
| KR | 10-1186969 B1 | 9/2012 |
| KR | 10-1227644 B1 | 1/2013 |
| KR | 10-2013-0028453 A | 3/2013 |
| KR | 10-1301918 B1 | 8/2013 |
| KR | 10-1408987 B1 | 6/2014 |

* cited by examiner

*Primary Examiner* — Yuriy Semenenko
(74) *Attorney, Agent, or Firm* — Knobbe, Martens, Olson & Bear, LLP

(57) ABSTRACT

A rollable display is disclosed. In one aspect, the rollable display includes a flexible display panel configured to display an image via at least a portion thereof and a housing accommodating at least a portion of the flexible display panel. The flexible display panel has a point of inflection in the portion of the flexible display panel accommodated in the housing.

21 Claims, 8 Drawing Sheets

ROLLABLE DISPLAY

INCORPORATION BY REFERENCE TO ANY PRIORITY APPLICATIONS

This U.S. non-provisional patent application claims priority under 35 U.S.C. §119 of Korean Patent Application No. 10-2014-0157422, filed on Nov. 12, 2014, the contents of which are hereby incorporated by reference in its entirety.

BACKGROUND

Field

The described technology generally relates to a rollable display.

Description of the Related Technology

As the market demand for flexible displays increases, various flexible displays such as a curved display having a specific curvature, a foldable display having a specific radius of curvature or which can be bent with respect to a folding axis, a rollable display which can be rolled to a specific radius of curvature, are undergoing research and development.

Among the different flexible display types, the rollable display has been widely and rigorously researched since it has advantageous properties, such as a wide display area, a superior mobility, etc.

SUMMARY OF CERTAIN INVENTIVE ASPECTS

One inventive aspect is a rollable display having improved display quality.

Another aspect is a rollable display including a flexible display panel and a housing. The flexible display panel displays an image through at least a portion thereof. The housing accommodates at least a portion of the flexible display panel. The flexible display panel has a point of inflection when accommodated in the housing.

The rollable display further includes a reel core. The reel core is connected to the flexible display panel and accommodated in the housing. The flexible display panel is rolled along an outer circumference surface of the reel core.

The housing includes a first housing and a second housing. The first housing accommodates the reel core therein and has a first radius of curvature. The second housing is connected to the first housing and has a second radius of curvature.

One end of the second housing is connected to the first housing and the other end of the second housing exposes the flexible display panel to an exterior of the second housing.

A center of curvature of the first housing is positioned in the first housing and a center of curvature of the second housing is outside of the second housing.

The flexible display panel includes a first flexible display panel, a second flexible display panel, and a third flexible display panel. The first flexible display panel is accommodated in the first housing and surrounds the reel core. The second flexible display panel is connected to the first flexible display panel and accommodated in the first housing and the second housing. The third flexible display panel is connected to the second flexible display panel and displays the image.

The second flexible display panel has the point of inflection.

The third flexible display panel is exposed to the exterior of the housing. The first flexible display panel has a convex shape when viewed in a thickness direction of the third flexible display panel and the second flexible display panel has a concave shape when viewed in the thickness direction of the third flexible display panel.

The first flexible display panel has a circular or oval shape when viewed in a cross-sectional view.

The third flexible display panel is exposed to the exterior of the housing. The first housing has a convex shape when viewed in a thickness direction of the third flexible display panel and the second housing has a concave shape when viewed in the thickness direction of the third flexible display panel.

The first housing has a circular or oval shape when viewed in a cross-sectional view.

The first housing includes a first upper housing and a first lower housing. The first upper housing has a convex shape when viewed in a cross-sectional view and the first lower housing is connected to the first upper housing and has a concave shape when viewed in the cross-sectional view. The second housing includes a second upper housing and a second lower housing. The second upper housing is connected to the first upper housing and has concave shape when viewed in the cross-sectional view and the second lower housing faces the second upper housing, is connected to the first lower housing, and has a concave shape when viewed in the cross-sectional view.

The rollable display further includes a protective film and a protective housing. The protective film is arranged under the flexible display panel to protect the flexible display panel. The protective housing accommodates at least a portion of the protective film.

The rollable display further includes a protective reel core connected to the protective film and accommodated in the protective housing. The protective film is rolled along an outer circumference surface of the protective reel core.

The protective film protects the flexible display panel exposed to the exterior of the housing.

The protective housing is arranged on the second housing.

Another aspect is a rollable display including a flexible display panel and a housing. The flexible display panel displays an image through at least a portion thereof. The housing accommodates at least a portion of the flexible display panel. The housing includes a first upper housing, a second upper housing, a first lower housing, and a second lower housing. The first upper housing includes a first peak. The second upper housing is connected to the first upper housing and includes a first valley. The first lower housing is connected to the first upper housing and includes a second valley. The second lower housing is connected to the first lower housing, spaced apart from the second upper housing, and includes a third valley.

The flexible display panel is arranged in the housing and includes a peak and a valley.

The rollable display further includes a reel core. The reel core is connected to the flexible display panel and arranged between the first upper housing and the first lower housing. The flexible display panel includes a first flexible display panel, a second flexible display panel, and a third flexible display panel. The first flexible display panel surrounds the reel core. The second flexible display panel is connected to the first flexible display panel, includes a valley, and does not include a peak. The third flexible display panel is connected to the second flexible display panel to display the image.

Another aspect is a rollable display comprising a flexible display panel configured to display an image via at least a portion thereof; and a housing accommodating at least a portion of the flexible display panel, wherein the flexible display panel has a point of inflection in the portion of the flexible display panel accommodated in the housing.

In exemplary embodiments, the rollable display further comprises a reel core connected to the flexible display panel and accommodated in the housing, wherein the flexible display panel is configured to be rolled along an outer surface of the reel core. The housing can comprise a first housing accommodating the reel core therein and having a first radius of curvature; and a second housing connected to the first housing and having a second radius of curvature. In exemplary embodiments, the second housing does not accommodate the reel core therein. One end of the second housing can be connected to the first housing and the other end of the second housing can comprise an opening through which the flexible display panel is configured to be withdrawn from the housing. The first housing can have a center of curvature located within the first housing and wherein the second housing has a center of curvature located outside of the second housing.

In exemplary embodiments, the flexible display panel comprises a first flexible display panel accommodated in the first housing and surrounding the reel core; a second flexible display panel connected to the first flexible display panel and accommodated in the first housing and the second housing; and a third flexible display panel connected to the second flexible display panel and configured to display the image. The second flexible display panel can have the point of inflection. The third flexible display panel can be configured to be exposed to the exterior of the housing, the first flexible display panel can have a convex shape when viewed from a first direction, and the second flexible display panel can have a concave shape when viewed from the first direction. The first flexible display panel can have a substantially circular or oval cross-sectional shape.

In exemplary embodiments, the third flexible display panel is configured to be exposed to the exterior of the housing, wherein the first housing has a convex shape when viewed from a first direction, and wherein the second housing has a concave shape when viewed from the first direction. The first housing can have a substantially circular or oval cross-sectional shape.

In exemplary embodiments, the first housing comprises a first upper housing having a convex shape when viewed from a first direction; and a first lower housing connected to the first upper housing and having a concave shape when viewed from the first direction, wherein the second housing comprises: a second upper housing connected to the first upper housing and having a concave shape when viewed from the first direction; and a second lower housing opposing the second upper housing, connected to the first lower housing, and having a concave shape when viewed from the first direction.

In exemplary embodiments, the rollable display can further comprise a protective film configured to be arranged under the flexible display panel and a protective housing accommodating at least a portion of the protective film. The rollable display can further comprise a protective reel core connected to the protective film and accommodated in the protective housing, and the protective film can be configured to be rolled along an outer surface of the protective reel core. The protective film can be configured to protect the flexible display panel when exposed to the exterior of the housing. The protective housing can be arranged on the second housing.

Another aspect is a rollable display comprising a flexible display panel configured to display an image via at least a portion thereof; and a housing accommodating at least a portion of the flexible display panel, wherein the housing comprises: a first upper housing comprising a first peak; a second upper housing connected to the first upper housing and comprising a first valley; a first lower housing connected to the first upper housing and comprising a second valley; and a second lower housing connected to the first lower housing, spaced apart from the second upper housing, and comprising a third valley.

In exemplary embodiments, the portion of the flexible display panel arranged in the housing has a peak and a valley. The rollable display can further comprise a reel core connected to the flexible display panel and arranged between the first upper housing and the first lower housing, wherein the flexible display panel can further comprise a first flexible display panel surrounding the reel core; a second flexible display panel connected to the first flexible display panel, wherein the second flexible display panel has a valley and does not have a peak; and a third flexible display panel connected to the second flexible display panel and configured to display the image.

According to the above, the display quality of the rollable display may be improved.

BRIEF DESCRIPTION OF THE DRAWINGS

The above and other advantages of the described technology will become readily apparent by reference to the following detailed description when considered in conjunction with the accompanying drawings wherein.

DETAILED DESCRIPTION OF CERTAIN INVENTIVE EMBODIMENTS

Figure 1A:
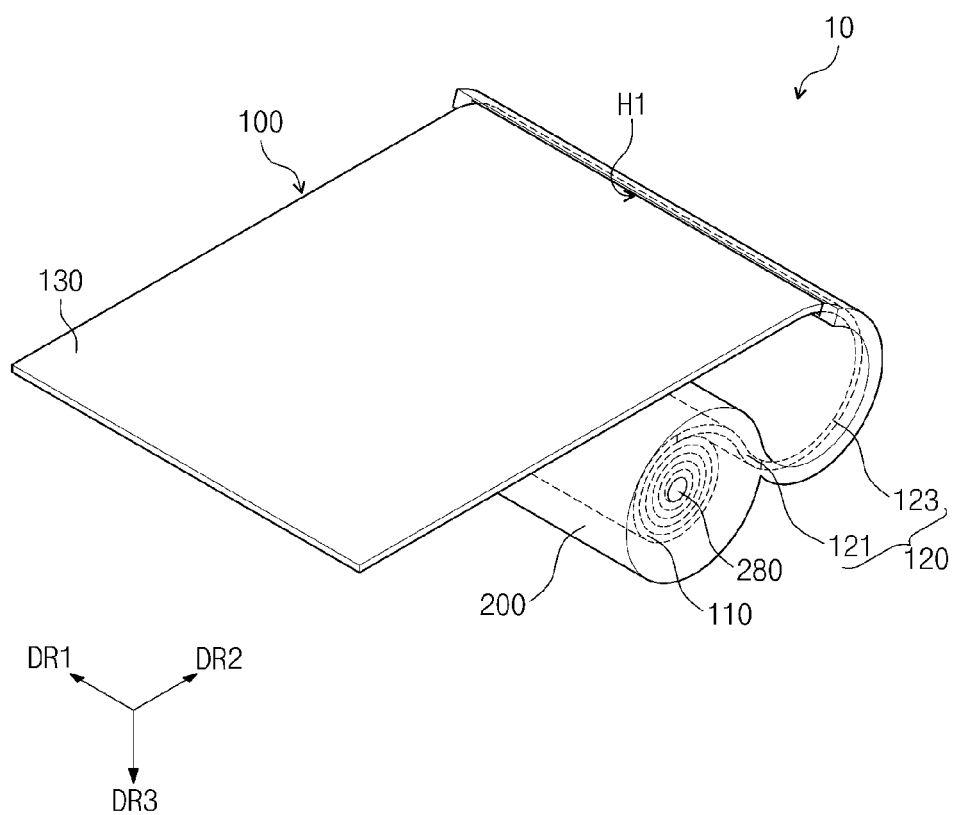
FIGS. 1A and 1B are perspective views showing a rollable display according to an exemplary embodiment.

It will be understood that when an element or layer is referred to as being "on", "connected to" or "coupled to" another element or layer, it can be directly on, connected or coupled to the other element or layer or intervening elements or layers may also be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the described technology.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein are to be interpreted accordingly.

The terminology used herein is for the purpose of describing particular embodiments only and is not intended to be limiting of the described technology. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the described technology belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the described technology will be explained in detail with reference to the accompanying drawings.

Figure 1B:
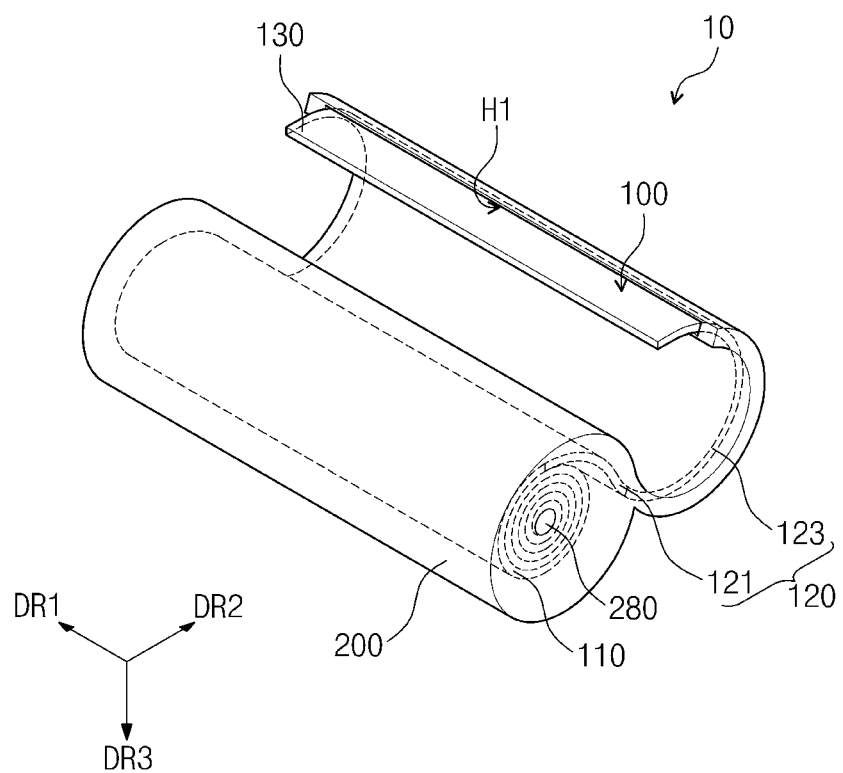

FIGS. 1A and 1B are perspective views showing a rollable display 10 according to an exemplary embodiment.

Referring to FIGS. 1A and 1B, the rollable display 10 includes a flexible display panel 100 and a housing 200. The flexible display panel 100 displays an image through at least a portion thereof. The flexible display panel 100 has a point of inflection POI (hereinafter, referred to as an inflection point) (refer to FIG. 3B) when located inside the housing 200.

Referring to FIG. 1A, the flexible display panel 100 is exposed to the exterior of the housing 200 when an external force is applied to the flexible display panel 100. Referring to FIG. 1B, the flexible display panel 100 is rolled and kept inside the housing 200.

The flexible display panel 100 employs a flexible substrate, and thus the flexible display panel 100 is flexible. To this end, the flexible display panel 100 includes at least one of the following materials: polycarbonate (PC), polyethyleneterephthalate (PET), polyethylene (PE), polypropylene (PP), polysulfone (PSF), polymethylmethacrylate (PMMA), triacetylcellulose (TAC), cycloolefin polymer (COP), and cycloolefin copolymer (COC).

The flexible display panel 100 is rolled or stretched with respect to at least one rolling axis in the housing 200. The flexible display panel 100 is exposed to the exterior of the housing 200 by the external force applied thereto. For instance, the flexible display panel 100, which is rolled and kept inside the housing 200, is exposed to the exterior of the housing 200 after passing through an opening portion or opening H1 formed through the housing 200 by the external force.

Figure 4A:
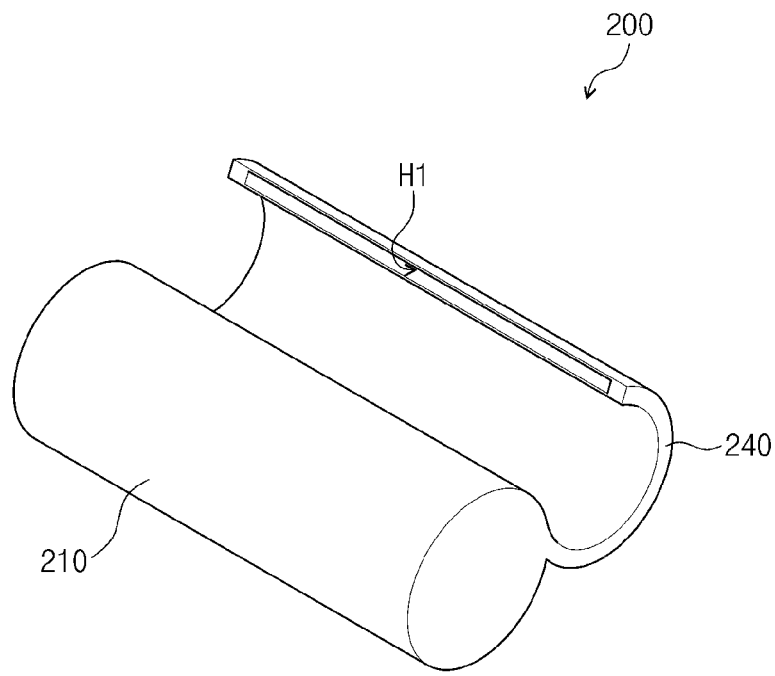
FIG. 4A is a perspective view showing a housing included in a rollable display according to an exemplary embodiment.

The housing 200 accommodates at least a portion of the flexible display panel 100. The housing 200 includes a first housing 210 in FIG. 4A and a second housing 240 in FIG. 4A. The second housing 240 in FIG. 4A is connected to the first housing 210 in FIG. 4A in a second direction DR2.

The housing 200 includes a reel core 280 on which the flexible display panel 100 is rolled with respect to the rolling axis. The rolling axis is substantially parallel to a first direction DR1. The reel core 280 has a substantially cylindrical shape elongated along the rolling axis. In FIGS. 1A and 1B, the reel core 280 is integrally formed as a single unitary and individual unit, but it should not be limited thereto or thereby. That is, the reel core 280 may be manufactured by assembling two or more sub-reel cores with each other.

The flexible display panel 100 is rolled and kept inside the housing 200. For instance, the flexible display panel 100 is connected to the reel core 280 placed in the housing 200 and then rolled or stretched. In FIGS. 1A and 1B, the flexible display panel 100 surrounds the reel core 280 having the cylindrical shape, but it should not be limited thereto or thereby. That is, the reel core 280 can include a coupling recess (not shown) and the flexible display panel 100 can be coupled to the coupling recess.

The housing 200 included in the rollable display 10 will be described in detail later.

Figure 2:
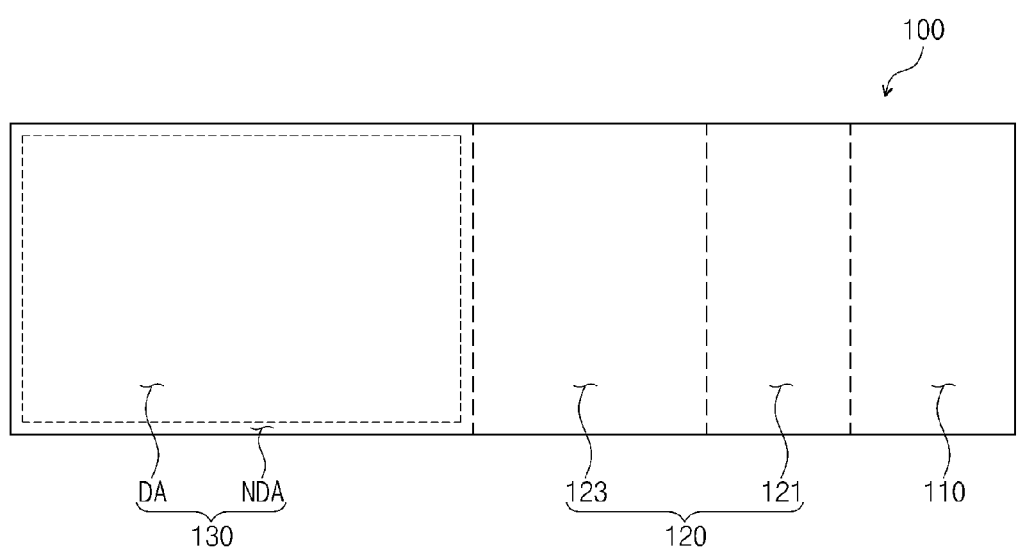
FIG. 2 is a plan view showing a flexible display panel included in a rollable display according to an exemplary embodiment.
Figure 3A:
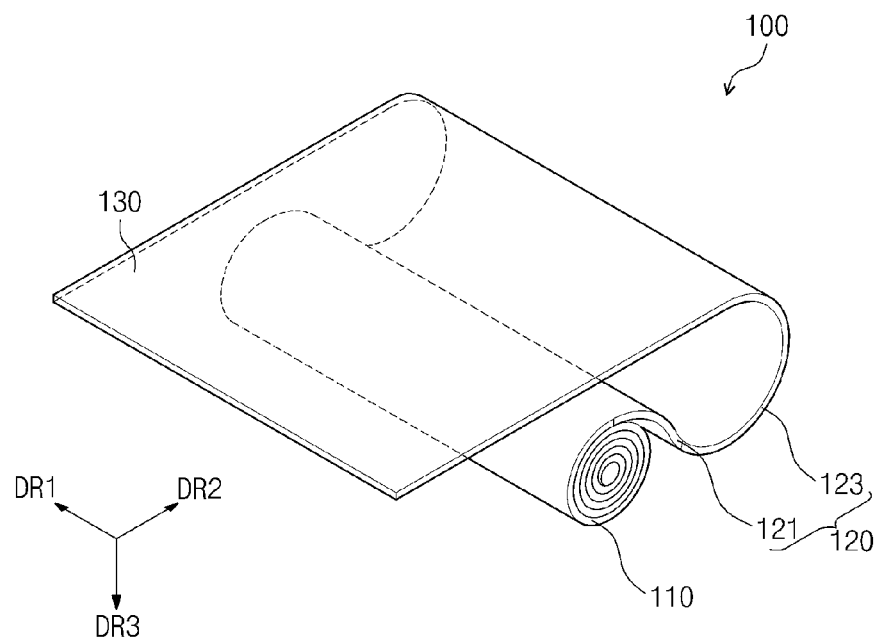
FIG. 3A is a perspective view showing a flexible display panel included in a rollable display according to an exemplary embodiment.
Figure 3B:
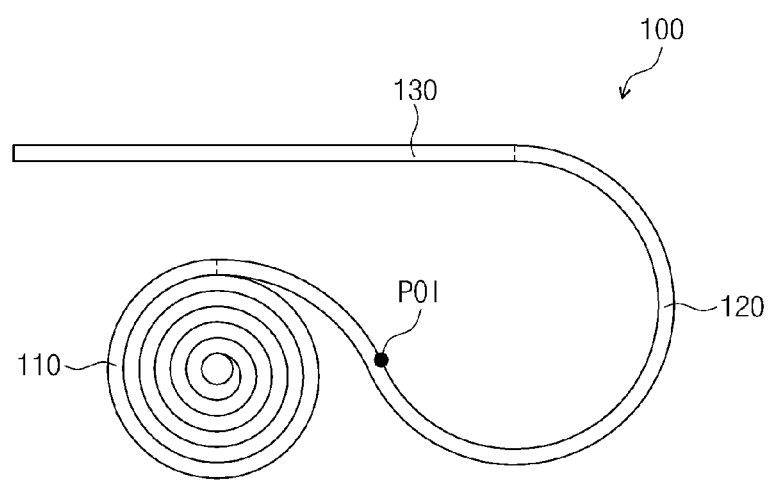
FIG. 3B is a side view showing a flexible display panel included in a rollable display according to an exemplary embodiment.

FIG. 2 is a plan view showing the flexible display panel 100 included in the rollable display 10 according to an exemplary embodiment. FIG. 3A is a perspective view showing the flexible display panel 100 included in the rollable display 10 according to an exemplary embodiment. FIG. 3B is a side view showing the flexible display panel 100 included in the rollable display 10 according to an exemplary embodiment.

Referring to FIGS. 1A, 1B, 2, 3A, and 3B, the flexible display panel 100 has the inflection point POI. The flexible display panel 100 having the inflection point POI includes a concave portion and a convex portion in a cross-sectional view when the flexible display panel 100 is rolled and kept in the housing 200. Since the flexible display panel 100 includes the concave and convex portions when viewed from the cross-sectional view, stress applied to the flexible display panel 100 is distributed when the flexible display panel 100 is rolled or stretched. That is, the rollable display according to the present exemplary embodiment distributes the stress applied to the flexible display panel 100 to reduce or remove cracks occurring on the flexible display panel 100, and thus a display quality of the rollable display is improved.

The flexible display panel 100 includes a first flexible display panel 110, a second flexible display panel 120, and a third flexible display panel 130.

The flexible display panel 110 surrounds the reel core 280 and is kept in the housing 200. The first flexible display panel 110 may have various shapes, e.g., a circular shape, an oval shape, etc., in consideration of the shape of the reel core 280.

When viewed in a thickness direction of the third flexible display panel 130, the first flexible display panel 110 has a convex shape. For instance, the first flexible display panel 110 has the circular shape or the oval shape in the cross-sectional view.

The second flexible display panel 120 is connected to the first flexible display panel 110. The second flexible display panel 120 includes a valley and does not include a peak.

The second flexible display panel 120 can be kept in the first housing 210 and the second housing 240. The second flexible display panel 120 can have the inflection point POI. The second flexible display panel 120 includes a first sub-flexible display panel 121 and a second sub-flexible display panel 123.

The first sub-flexible display panel 121 is kept inside the first housing 210. The first sub-flexible display panel 121 is connected to the first flexible display panel 110.

The second sub-flexible display panel 123 is kept inside the second housing 240. The second sub-flexible display panel 123 is connected to the first sub-flexible display panel 121. The second sub-flexible display panel 123 can have the concave shape when viewed in a thickness direction DR3 of the third flexible display panel 130.

The third flexible display panel 130 is connected to the second flexible display panel 120. The third flexible display panel 130 is exposed to the exterior of the housing 200 to display the image.

The third flexible display panel 130 includes a display area DA and a non-display area NDA surrounding the display area DA. The display area DA has a substantially rectangular shape when viewed in the thickness direction DR3 of the third flexible display panel 130, but the shape of the display area DA should not be limited to the rectangular shape.

The display area DA displays the image. Although not shown in figures, a plurality of pixels, each functioning as a minimum unit to display the image are included in the display area DA. Each pixel includes at least one thin film transistor.

The non-display area NDA does not display the image. Although not shown in figures, a driver, which is electrically connected to the pixels and applies signals to the pixels to display the image, can be formed in the non-display area NDA. The driver includes a data driver converting an image signal to a data signal to apply the data signal to the flexible display panel 100 and a gate driver applying a gate signal to the flexible display panel 100, but it should not be limited thereto or thereby. At least one of the data and gate drivers can be manufactured in a chip form to be mounted on a tape carrier package or on a printed circuit board.

Although not shown in figures, the third flexible display panel 130 includes an image display part or display element. The image display part emits light or controls light incident thereto. The image display part can be one of an electrophoretic display (EPD) element, an electrowetting display (EWD) element, and an organic light-emitting diode (OLED) display element, which can be included in the rollable display 10. Hereinafter, the OLED display element will be described as the image display part.

The image display part includes an anode electrode, an organic light-emitting layer, and a cathode electrode. Holes and electrons respectively injected into the organic light-emitting layer from the anode and cathode electrodes are recombined in the organic light-emitting layer to generate excitons. The image display part 120 emits light when the excitons return to a ground state from an excited state.

Figure 4B:
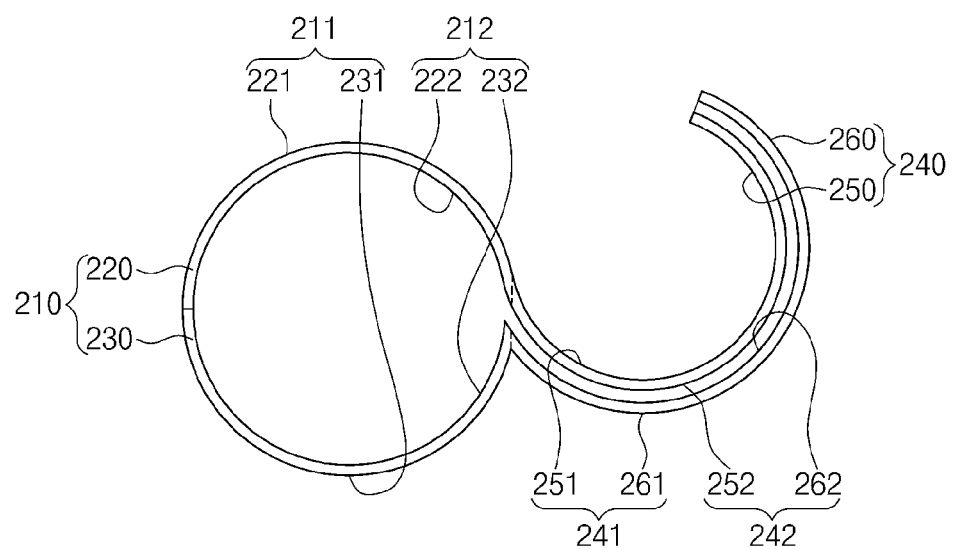
FIGS. 4B and 4C are side views showing a housing included in a rollable display according to an exemplary embodiment.
Figure 4C:
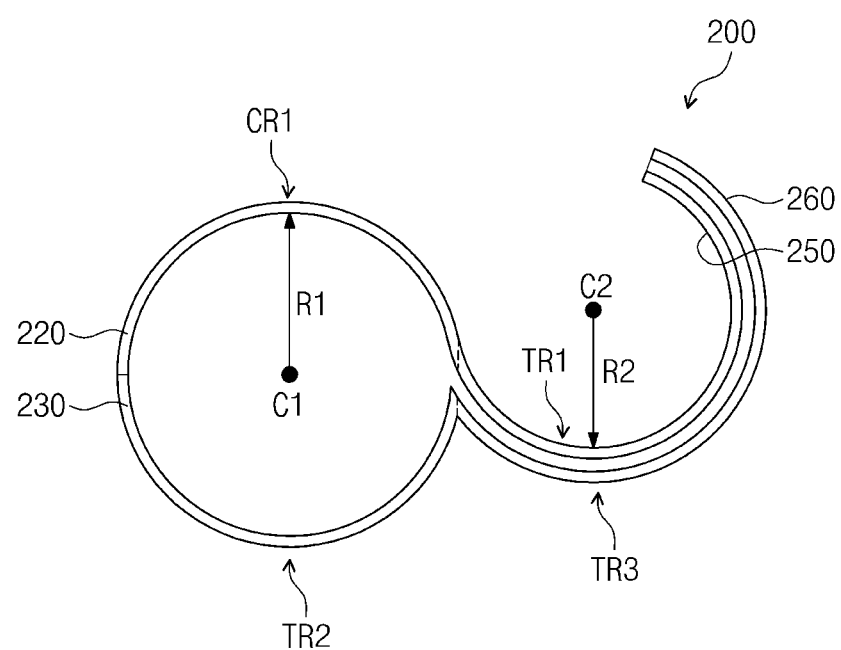

FIG. 4A is a perspective view showing the housing 200 included in the rollable display 10 according to an exemplary embodiment. FIGS. 4B and 4C are side views showing the housing 200 included in the rollable display 10 according to an exemplary embodiment.

Referring to FIGS. 1A, 1B, and 4A to 4C, the housing 200 accommodates the flexible display panel 100. The housing 200 includes the first housing 210 and the second housing 240.

The first housing 210 accommodates the reel core 280 therein. The first housing 210 also accommodates the flexible display panel 100 therein.

The first housing 210 includes a first outer surface 211 and a first inner surface 212. The flexible display panel 100 is arranged along the first inner surface 212 in the first housing 210. The first outer surface 211 is exposed to the exterior of the first housing 210. The first outer surface 211 includes a first upper outer surface 221 and a first lower outer surface 231. The first upper outer surface 221 and the first lower outer surface 231 are connected to each other. The first outer surface 211 can have a circular shape or an oval shape, from which a portion thereof is removed, when viewed in a cross-sectional view.

The first inner surface 212 faces the first outer surface 211. The first inner surface 212 is formed in the first housing 210. The first inner surface 212 includes a first upper inner surface 222 and a first lower inner surface 232. The first inner surface 212 can have a circular shape or an oval shape, from which a portion thereof is removed, when viewed in a cross-sectional view.

The first housing 210 has a first radius of curvature R1. A center of curvature C1 (hereinafter, referred to as a curvature center) of the first housing 210 is positioned inside the first housing 210. The first radius of curvature R1 corresponds to the shortest distance between a position on the first inner surface 212 and the curvature center C1 of the first housing 210.

The first housing 210 has substantially a cylindrical or oval cylindrical shape. The first housing 210 has substantially a circular or oval shape when viewed in a cross-sectional view. When viewed in the thickness direction DR3 of the third flexible display panel 130, the first housing 210 has the convex shape.

The first housing 210 includes a first upper housing 220 and a first lower housing 230. The first upper housing 220 and the first lower housing 230 are connected to each other.

The first upper housing 220 is connected to the first lower housing 230. The first upper housing 220 is connected to a second upper housing 250. The first upper housing 220 includes a first peak CR1. The first upper housing 220 can have the convex shape when viewed in the thickness direction DR3 of the third flexible display panel 130.

The first upper housing 220 includes the first upper outer surface 221 and the first upper inner surface 222. The first upper outer surface 221 is exposed to the exterior of the first housing 210. The first upper outer surface 221 can have the convex shape when viewed in the thickness direction DR3 of the third flexible display panel 130. The first upper inner surface 222 faces the first upper outer surface 221. The first upper inner surface 222 is arranged in the first housing 210 and is not exposed to the exterior of the first housing 210. The first upper inner surface 222 can have the convex shape when viewed in the thickness direction DR3 of the third flexible display panel 130.

The first lower housing 230 is connected to the first upper housing 220. The first lower housing 230 is connected to a second lower housing 260. The first lower housing 230 includes a second valley TR2. The first lower housing 230 can have the concave shape when viewed in the thickness direction DR3 of the third flexible display panel 130.

The first lower housing 230 includes the first lower outer surface 231 and the first lower inner surface 232. The first lower outer surface 231 is exposed to the exterior of the first housing 210. The first lower outer surface 231 can have the concave shape when viewed in the thickness direction DR3 of the third flexible display panel 130. The first lower inner surface 232 faces the first lower outer surface 231. The first lower inner surface 232 is arranged in the first housing 210 and is not exposed to the outside of the first housing 210. The first lower inner surface 232 can have the concave shape when viewed in the thickness direction DR3 of the third flexible display panel 130.

The second housing 240 is connected to the first housing 210. One end of the second housing 240 is connected to the first housing 210 and the other end of the second housing 240 enables the flexible display panel 100 to be exposed to the exterior of the second housing 240. The second housing 240 accommodates the flexible display panel 100 therein. The second housing 240 does not accommodate the reel core 280.

The second housing 240 includes a second outer surface 241 and a second inner surface 242. The flexible display panel 100 is arranged along the second inner surface 242 in the second housing 240. The second outer surface 241 includes a second upper outer surface 251 and a second lower outer surface 261. The second upper outer surface 251 and the second lower outer surface 261 are connected to each other. The second outer surface 241 has a shape substantially corresponding to at least one of a circular arc, an elliptical arc, a parabola, or a hyperbola when viewed in a cross-sectional view.

The second inner surface 242 faces the second outer surface 241. The second inner surface 242 is arranged in the second housing 240. The second inner surface 242 includes a second upper inner surface 252 and a second lower inner surface 262. The second inner surface 242 has a shape substantially corresponding to at least one of a circular arc, an elliptical arc, a parabola, or a hyperbola when viewed in a cross-sectional view.

The second housing 240 has a second radius of curvature R2. The second radius of curvature R2 can be equal to or different from the first radius of curvature R1. A curvature center C2 of the second housing 240 can be positioned outside the second housing 240. The second radius of curvature R2 corresponds to the shortest distance between a position on the second upper outer surface 251 and the curvature center C2 of the second housing 240.

The second housing 240 has a substantially tube shape. When viewed in the thickness direction DR3 of the third flexible display panel 130, the second housing 240 has the concave shape.

The second housing 240 includes a second upper housing 250 and a second lower housing 260. The second upper housing 250 and the second lower housing 260 are spaced apart from each other.

The second upper housing 250 is connected to the first upper housing 220 and spaced apart from the second lower housing 260. The second upper housing 250 includes a first valley TR1. The second upper housing 250 has the concave shape when viewed in the thickness direction DR3 of the third flexible display panel 130.

The second upper housing 250 includes the second upper outer surface 251 and the second upper inner surface 252. The second upper outer surface 251 is exposed to the exterior of the second housing 240. The second upper outer surface 251 has the concave shape when viewed in the thickness direction DR3 of the third flexible display panel 130. The second upper inner surface 252 faces the second upper outer surface 251. The second upper inner surface 252 is arranged in the second housing 240 and is not exposed to the exterior of the second housing 240. The second upper inner surface 252 has the concave shape when viewed in the thickness direction DR3 of the third flexible display panel 130.

The second lower housing 260 is connected to the first lower housing 230 and spaced apart from the second upper housing 250. The second lower housing 260 includes a third valley TR3. The second lower housing 260 has the concave shape when viewed in the thickness direction DR3 of the third flexible display panel 130.

The second lower housing 260 includes a second lower outer surface 261 and a second lower inner surface 262. The second lower outer surface 261 is exposed to the exterior of the second housing 240. The second lower outer surface 261 has the concave shape when viewed in the thickness direction DR3 of the third flexible display panel 130. The second lower inner surface 262 faces the second lower outer surface 261. The second lower inner surface 262 is arranged in the second housing 240 and is not exposed to the exterior of the second housing 240. The second lower inner surface 262 has the concave shape when viewed in the thickness direction DR3 of the third flexible display panel 130.

In FIGS. 1A, 1B, and 4A to 4C, the housing 200 is integrally formed as a single unitary and individual unit, but it should not be limited thereto or thereby. The housing 200 can be manufactured by assembling two or more sub-housings to each other. In addition, the first housing 210 has the substantially cylindrical shape in FIGS. 1A, 1B, and 4A to 4C, but it should not be limited thereto or thereby. The housing 200 can have various shapes as long as the flexible display panel 100 is rolled and kept in the housing 200.

Figure 5A:
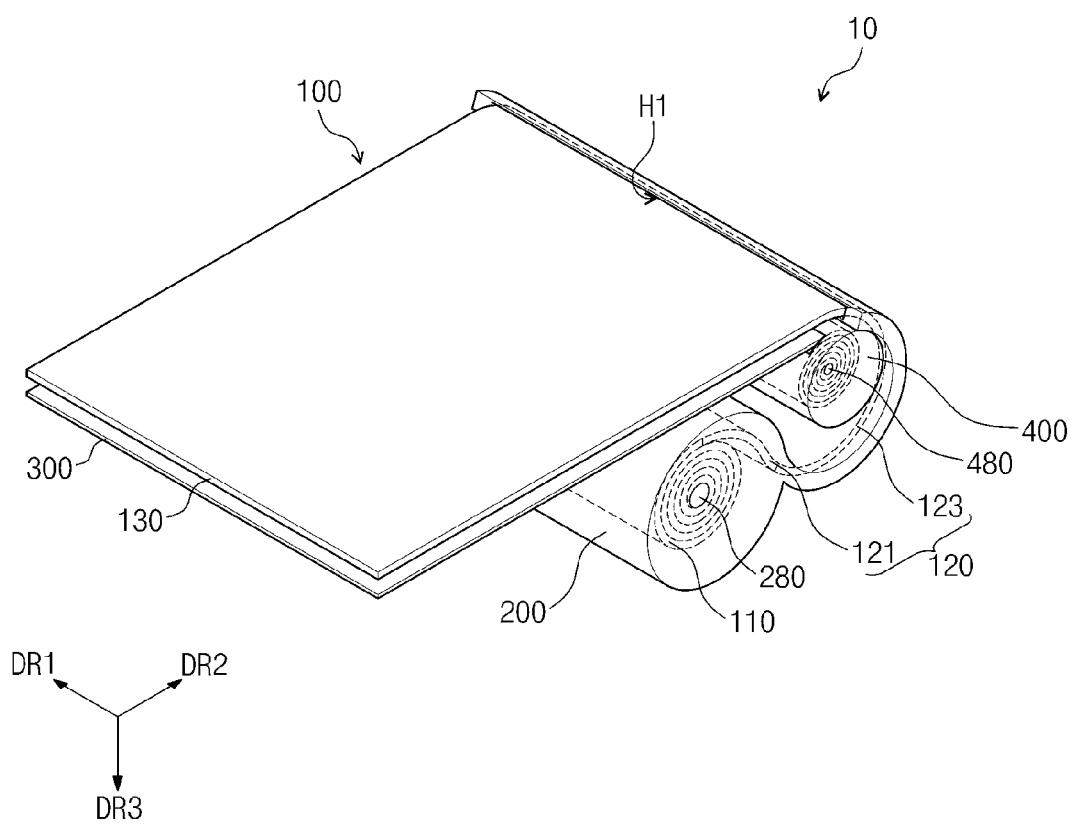
FIGS. 5A and 5B are perspective view showing a rollable display according to an exemplary embodiment.
Figure 5B:
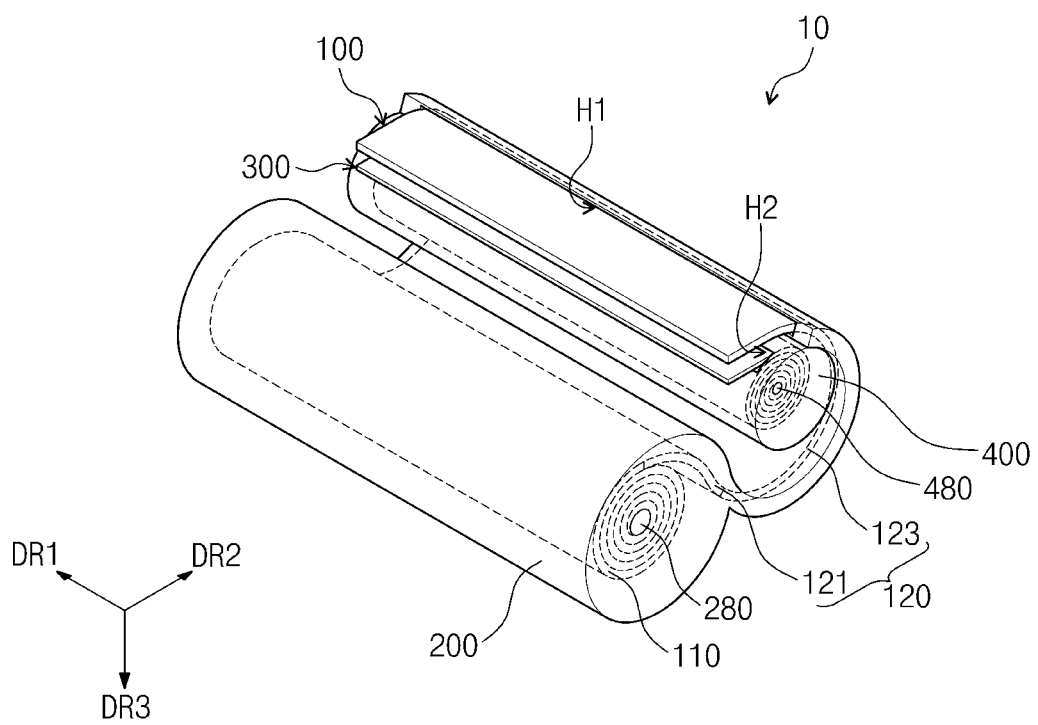

FIGS. 5A and 5B are perspective view showing the rollable display 10 according to an exemplary embodiment.

Referring to FIGS. 5A and 5B, the rollable display 10 can further include a protective film 300 and a protective housing 400. The protective housing 400 can accommodate a protective reel core 480 therein.

The protective film 300 is arranged under the flexible display panel 100 to protect the flexible display panel 100. The protective film 300 protects the flexible display panel 100 exposed to the exterior of the housing 200. The protective film 300 is rolled along an outer circumference surface of the protective reel core 480. As shown in FIG. 5A, the flexible display panel 100 is exposed to the exterior of the housing 200 via the application of an external force and the protective film 300 is exposed to the exterior of the protective housing 400 via the application of an external force. As shown in FIG. 5B, the flexible display panel 100 is rolled and kept in the housing 200 and the protective film 300 is rolled and kept in the protective housing 400.

The protective film 300 is rolled or stretched in the protective housing 400 with respect to at least one rolling axis. The protective film 300 can be exposed to the exterior of the protective housing 400 when the external force is applied to the protective film 300. For instance, the protective film 300, which is rolled and kept inside the protective housing 400, is exposed to the exterior of the protective housing 400 after passing through an opening portion H2 formed through the protective housing 400 via the application of the external force.

The protective film 300 includes at least one of the following materials: polycarbonate (PC), polyethyleneterephthalate (PET), polyethylene (PE), polypropylene (PP), polysulfone (PSF), polymethylmethacrylate (PMMA), triacetylcellulose (TAC), cycloolefin polymer (COP), and cycloolefin copolymer (COC).

The protective housing 400 accommodates at least a portion of the protective film 300. The protective housing 400 can be arranged on the second housing 240. In FIGS. 5A and 5B, the protective housing 400 has substantially a cylindrical shape provided with the opening portion, but it should not be limited thereto or thereby. The protective housing 400 can have various shapes as long as the protective film 300 can be rolled and kept in the protective housing 400.

In addition, the protective housing 400 shown in FIGS. 5A and 5B is integrally formed as a single unitary and individual unit, but it should not be limited thereto or thereby. That is, the protective housing 400 can be manufactured by assembling two or more sub-housings with each other.

The protective housing 400 includes the protective reel core 480 on which the protective film 300 is rolled with respect to the rolling axis. The rolling axis may be substantially parallel to the first direction DR1. The protective reel core 480 has substantially a cylindrical shape elongated along the rolling axis. In FIGS. 5A and 5B, the protective reel core 480 is integrally formed as a single unitary and individual unit, but it should not be limited thereto or thereby. That is, the protective reel core 480 can be manufactured by assembling two or more sub-protective reel cores with each other.

The protective film 300 is rolled and kept in the protective housing 400. For instance, the protective film 300 is connected to the protective reel core 480 arranged in the protective housing 400 and then rolled or stretched. In FIGS. 5A and 5B, the protective film 300 has the substantially cylindrical shape to surround the protective reel core 480, but it should not be limited thereto or thereby. That is, the protective reel core 480 can include a coupling recess (not shown) and the protective film 300 can be coupled to the coupling recess.

Although not shown in figures, the rollable display 10 according to the present exemplary embodiment can further include a grip. When an external force is applied to the grip, the flexible display panel 100 can be exposed to the exterior of the housing 200. The grip can be connected to the flexible display panel 100. The grip can also be connected to the flexible display panel 100 and the protective film 300.

Although not shown in figures, the rollable display 10 can further include a touch screen panel and a window member. The touch screen panel is arranged on the image display part and the window member is arranged on the touch screen panel. The touch screen panel detects a position at which a touch event occurs and the window member protects the touch screen panel.

In the standard rollable display, a flexible display panel included in the standard rollable display does not have an inflection point. Thus, the standard flexible display panel does not distribute the stress applied thereto when being arranged and rolled in the housing. Thus the flexible display panel is bent due to the undistributed stress. When the stress applied to the flexible display panel is not distributed, cracks may occur on the flexible display panel and defects may occur resulting in malfunctioning pixels. As a result, the image is not clearly displayed in the flexible display panel and the display quality of the flexible display panel is deteriorated.

In the rollable display 10 according to at least one embodiment, the rollable display 10 has the inflection point when the flexible display panel is arranged in the housing. The flexible display panel having the inflection point includes the concave and convex portions when viewed in the cross-sectional view when being arranged and rolled in the housing. Accordingly, the flexible display panel is applied with the distributed stress when being rolled in the housing since the flexible display panel includes the concave and convex portions. That is, the rollable display according to at least one embodiment, distributes the stress applied to the flexible display panel and reduces the cracks occurring on the flexible display panel, thereby improving the display quality of the rollable display 10.

Although exemplary embodiments of the inventive technology have been described, it is understood that the invention should not be limited to these exemplary embodiments but various changes and modifications can be made by one ordinary skilled in the art within the spirit and scope of the invention as hereinafter claimed.

What is claimed is:

1. A rollable display, comprising:
    a flexible display panel configured to display an image via at least a first portion thereof; and
    a housing accommodating at least a second portion of the flexible display panel,
    wherein a point of inflection is defined in the second portion of the flexible display panel accommodated in the housing,
    wherein the housing comprises a first housing and a second housing connected to the first housing at a joint,
    wherein the point of inflection of the flexible display panel is adjacent to the joint between the first and second housings, and
    wherein the joint between the first and second housings is shaped so as to bend the flexible display panel to form the point of inflection.

2. The rollable display of claim 1, further comprising a reel core connected to the flexible display panel and accommodated in the housing, wherein the flexible display panel is configured to be rolled along an outer surface of the reel core.

3. The rollable display of claim 2, wherein:
    the first housing accommodates the reel core therein and has a first radius of curvature; and
    the second housing has a second radius of curvature.

4. The rollable display of claim 3, wherein the second housing does not accommodate the reel core therein.

5. The rollable display of claim 3, wherein one end of the second housing is connected to the first housing and the other end of the second housing comprises an opening through which the flexible display panel is configured to be withdrawn from the housing.

6. The rollable display of claim 3, wherein the first housing has a center of curvature located within the first housing and wherein the second housing has a center of curvature located outside of the second housing.

7. The rollable display of claim 3, wherein the flexible display panel comprises:
    a first flexible display panel accommodated in the first housing and surrounding the reel core;
    a second flexible display panel connected to the first flexible display panel and accommodated in the first housing and the second housing; and a third flexible display panel connected to the second flexible display panel and configured to display the image.

8. The rollable display of claim 7, wherein the point of inflection is defined in the second flexible display panel.

9. The rollable display of claim 7, wherein the third flexible display panel is configured to be exposed to the exterior of the housing, wherein the first flexible display panel has a convex shape when viewed from a first direction, and wherein the second flexible display panel has a concave shape when viewed from the first direction.

10. The rollable display of claim 9, wherein the first flexible display panel has a substantially circular or oval cross-sectional shape.

11. The rollable display of claim 7, wherein the third flexible display panel is configured to be exposed to the exterior of the housing, wherein the first housing has a convex shape when viewed from a first direction, and wherein the second housing has a concave shape when viewed from the first direction.

12. The rollable display of claim 11, wherein the first housing has a substantially circular or oval cross-sectional shape.

13. The rollable display of claim 3, wherein the first housing comprises:
    a first upper housing having a convex shape when viewed from a first direction; and
    a first lower housing connected to the first upper housing and having a concave shape when viewed from the first direction,
    wherein the second housing comprises:
    a second upper housing connected to the first upper housing and having a concave shape when viewed from the first direction; and
    a second lower housing opposing the second upper housing, connected to the first lower housing, and having a concave shape when viewed from the first direction.

14. The rollable display of claim 3, further comprising:
    a protective film configured to be arranged under the flexible display panel; and
    a protective housing accommodating at least a portion of the protective film.

15. The rollable display of claim 14, further comprising a protective reel core connected to the protective film and accommodated in the protective housing, wherein the protective film is configured to be rolled along an outer surface of the protective reel core.

16. The rollable display of claim 14, wherein the protective film is configured to protect the flexible display panel when exposed to the exterior of the housing.

17. The rollable display of claim 14, wherein the protective housing is arranged on the second housing.

18. A rollable display comprising:
    a flexible display panel configured to display an image via at least a portion thereof; and
    a housing accommodating at least a portion of the flexible display panel,
    wherein the housing comprises:
    a first upper housing comprising a first peak;
    a second upper housing connected to the first upper housing and comprising a first valley;
    a first lower housing connected to the first upper housing and comprising a second valley; and
    a second lower housing connected to the first lower housing, spaced apart from the second upper housing, and comprising a third valley.

19. The rollable display of claim 18, wherein the portion of the flexible display panel arranged in the housing has a peak and a valley.

20. The rollable display of claim 18, further comprising a reel core connected to the flexible display panel and arranged between the first upper housing and the first lower housing, wherein the flexible display panel comprises:
    a first flexible display panel surrounding the reel core;
    a second flexible display panel connected to the first flexible display panel, wherein the second flexible display panel has a valley and does not have a peak; and
    a third flexible display panel connected to the second flexible display panel and configured to display the image.

21. A rollable display, comprising:
    a flexible display panel; and
    a housing accommodating the flexible display panel,
    wherein the housing comprises a first housing and a second housing connected to the first housing, the first housing comprising a reeled portion of the flexible display panel, and the second housing comprising a non-reeled portion of the flexible display panel continuous with the reeled portion of the flexible display panel, and
    wherein the second housing comprises a second upper housing and a second lower housing, the second upper housing comprising an upper valley, and the second lower housing comprising a lower valley corresponding to the upper valley.

* * * * *